R. M. DIXON.
SYSTEM FOR CHARGING STORAGE BATTERIES.
APPLICATION FILED AUG. 10, 1912.
1,287,259.
Patented Dec. 10, 1918.
2 SHEETS—SHEET 1.
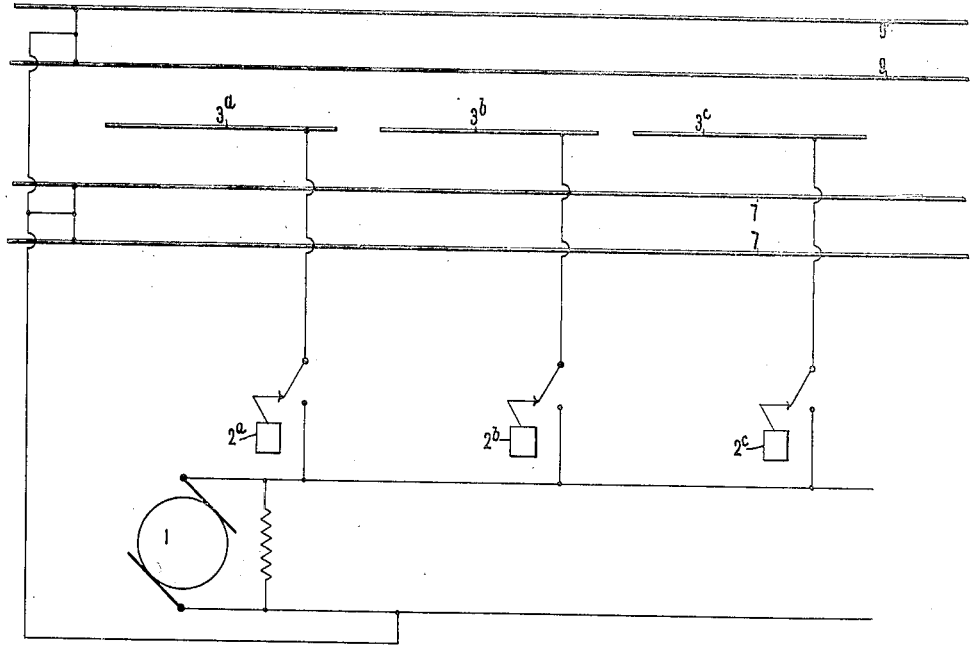
Fig. 2.
Fig. 3.
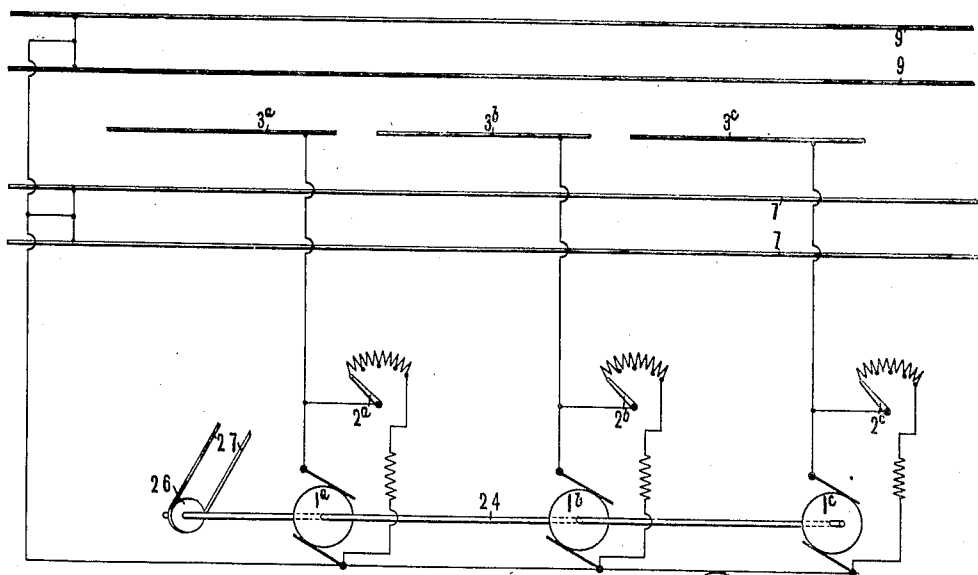

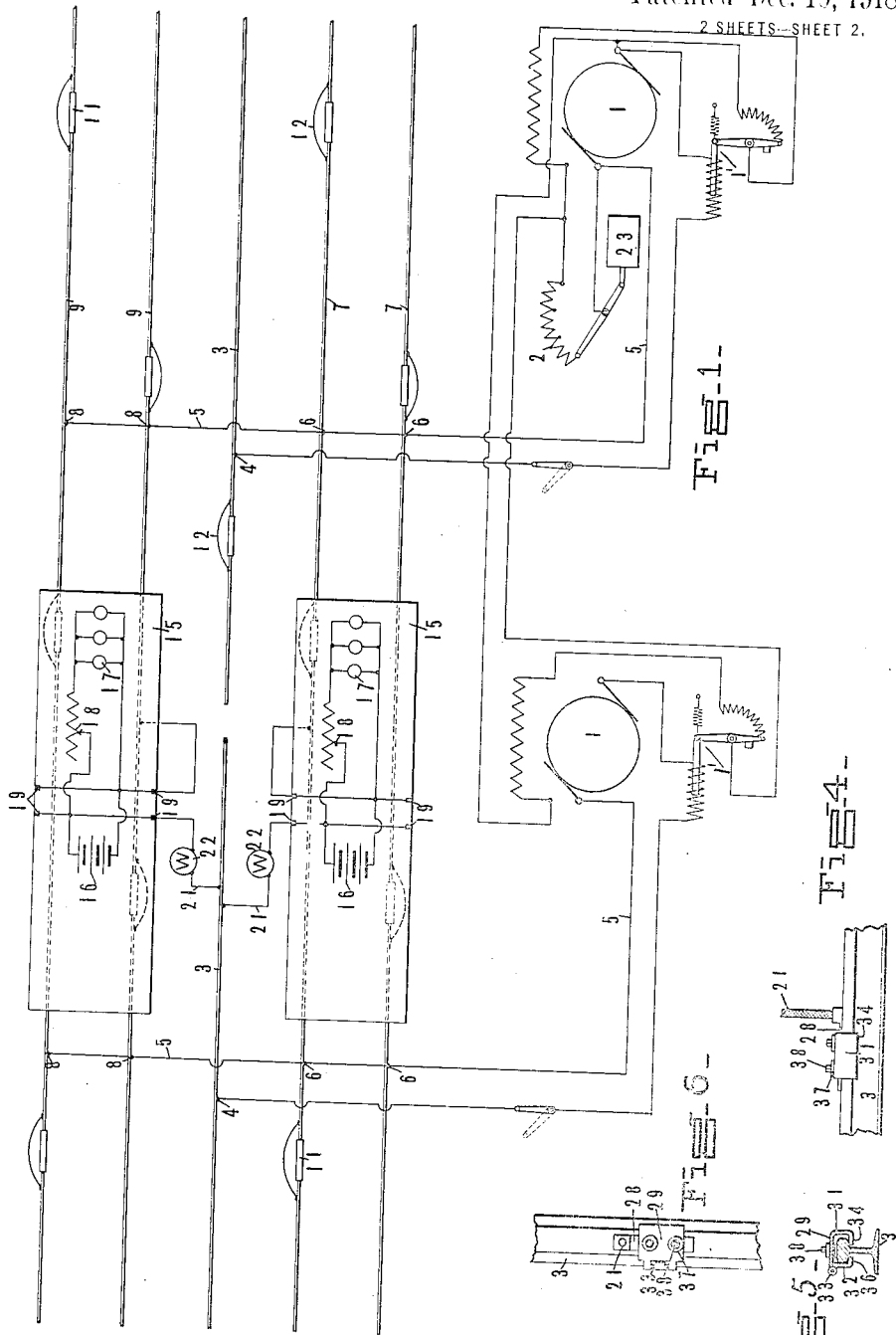

UNITED STATES PATENT OFFICE.

ROBERT M. DIXON, OF EAST ORANGE, NEW JERSEY, ASSIGNOR TO SAFETY CAR HEATING & LIGHTING COMPANY, A CORPORATION OF NEW JERSEY.

SYSTEM FOR CHARGING STORAGE BATTERIES.

1,287,259.  Specification of Letters Patent.  Patented Dec. 10, 1918.

Application filed August 10, 1912. Serial No. 714,338.

*To all whom it may concern:*

Be it known that I, ROBERT M. DIXON, a citizen of the United States, residing at East Orange, in the county of Essex and State of New Jersey, have invented certain new and useful Improvements in Systems for Charging Storage Batteries, of which the following is a full, clear, and exact description, such as will enable others skilled in the art to which it appertains to make and use the same.

This invention relates to the charging of storage batteries, and has especial reference to charging the so-called "straight storage battery" system of lighting railroad cars, that is, the system wherein the translation devices in each car are supplied with electrical energy from a storage battery situated usually underneath the car body, the battery being charged when the car is stationary.

One of the objects thereof is to provide a practical and efficient system for charging storage batteries in a short period of time by the use of heavy currents without an excessive outlay for the distributing conductors for the charging current. Another object of the invention is to provide means in a system of the above general type for the illumination of railway cars during the charging period. Another object is to provide automatic means for the necessary frequent interruptions or variations in charging current at the proper times. Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein is shown diagrammatically several of various possible embodiments of the several features of this invention, Figure 1 is a digrammatic view of the complete system;

Fig. 2 is a modification of part of the system illustrated in Fig. 1;

Fig. 3 is another modification of part of the system illustrated in Fig. 1; and

Figs. 4, 5 and 6 show, respectively, a longitudinal elevation, a transverse sectional elevation, and a plan of a clamp as applied to a rail-shaped conductor.

Similar reference characters refer to similar parts throughout the several views.

Referring now particularly to Fig. 1 of the drawings, showing a portion of a railroad yard where the car batteries may be charged, two or more constant potential generators 1, of any approved design, are provided with a time-controlled field rheostat 2 and are connected to their respective sections of a rail or conductor 3 between the tracks at points 4. The other terminals 5 of the generators are connected as at 6 to the two rails of the track 7 and at 8 to the two rails of the track 9. The conductor 3 extends between the tracks 7 and 9 for any suitable distance and is preferably an ordinary steel rail suitably bonded, and insulated from its supports similar to the mountings of an ordinary "third" rail. This conductor is preferably sectionalized as illustrated, and the rail joints 11 are preferably bonded as at 12 in order to reduce the resistance losses. In order to prevent overloading of any generator, each one is provided with a current-controlled variable resistance mechanism 1' in its field circuit. Thus, if too many car batteries are being charged at any one time from a single section, the current output of the generator feeding that section will be automatically kept within safe limits.

Each car, indicated at 15, is provided with a battery 16 adapted to supply lamps or other translating devices 17 through one or more automatic lamp-voltage regulators 18. A lamp-voltage regulator suitable for this purpose is shown in my Patent, No. 960,734, issued June 7, 1910. The battery terminals are connected permanently across each of two charging receptacles 19, one at each side of the car.

In charging, a suitable plug at the end of a pair of leads 21 is inserted in the charging receptacle 19 nearest the conductor 3 and the two leads 21 from said plug are connected by a clamp, shown in detail in Figs. 4, 5 and 6, or other device of low contact-resistance, to the nearest rail of the track and to the conductor 3, respectively. A current or energy measuring instrument 22, of either the indicating or integrating type, is inserted in one of the leads 21 and the provision of the automatic lamp regulator 18 enables the burning of the lamps at their proper voltage during the charging period. By means of the meter 22 the attendant can tell when to stop the charging. A volt-meter, either portable or mounted on the switchboard of the car, may be added to the equipment, if desired.

In some types of battery which are adapted to be charged in a short time, it is advisable that the charging current be varied or interrupted frequently; for example, it may be necessary in order to obtain the best results that the charging take place in about twenty "cycles", of three minutes each, each cycle comprising a period of two minutes when the current is flowing and a period of one minute when no current or substantially no current is flowing.

One way of accomplishing these current changes automatically is shown in Fig. 1, where the handle of the field rheostat 2 of the generator 1 is moved back and forth with the necessary rapidity at the proper intervals of time by a mechanism 23 of the general type illustrated in the patents to David H. Wilson, Numbers 1,126,666, 1,126,668, and 1,126,669, issued January 26, 1915, or by any other time-controlled mechanism. In one extreme position of the handle the generator voltage is only slightly in excess of the discharge voltage of a charged battery, while with the handle in the other extreme position the generator voltage is such as to send the desired charging current through a discharged battery. The handle should be moved slowly enough to avoid undue shocks of a mechanical nature in the generating apparatus and to prevent inductive trouble due to the rapid change in the magnitude of the charging current.

In Fig. 2 the apparatus is modified by dividing the electrical conductor 3 into three sections, 3$^a$, 3$^b$ and 3$^c$ and having three separate time-controlled current-interrupters 2$^a$, 2$^b$ and 2$^c$, in series with the feeders to the respective sections. With the cycle of operation consisting of two minutes charge and one minute rest, it is possible by having the three interrupters one-third of a cycle apart in "phase" to have a substantially constant load on the generator. This modification is open to the objection, however, that switches carrying large currents must be opened, which necessitates the use of heavy and expensive interrupters.

Fig. 3 shows another modification of the apparatus for producing a variable or interrupted current. In this figure, three generators, 1$^a$, 1$^b$, 1$^c$, are driven from the same source of power as by the shaft 24, pulley 26 and belt 27. The handles of the field rheostats 2$^a$, 2$^b$, 2$^c$ are operated as are the interrupters in Fig. 2, that is, one-third of a cycle apart, thereby insuring a constant load on the source of power.

In Figs. 4, 5 and 6 are illustrated a device suitable for clamping the leads 21 to the track rail or to the elongated conductor 3, if the latter takes the form of a rail. The lead 21 is permanently connected to a bar 28 of substantially rectangular cross-section which is adapted to lie flat against the top surface of the rail. The contacting surfaces of the rail and bar should be sand-papered, if necessary, in order to reduce the contact resistance. The member 29 is formed as a clevis at 31 whereby the member 32 is pivotally connected to the member 29 through the rod 33. Projections 34 and 36 of the members 29 and 32, respectively, engage the underside of the head of the rail. The member 29 is provided with screw-threaded cylindrical shoulders, or thickened portions 37, through which pass the bolts 38, or other screw-threaded members. As will be readily seen, the tightening of the clamping device by turning the bolts 38 brings the bar 28 into intimate electrical contact with the rail, whereby a low contact-resistance is assured.

While the operation and method of use of a system of this character will probably be clear from the above, a brief description thereof is substantially as follows: Cars having batteries to be charged are run into a position, as indicated in Fig. 1, adjacent the conductor or third rail 3. The leads 21, which are five or six feet in length, are plugged into the charging receptacle 19 on the side of the car adjacent the conductor, and one branch is clamped to the rail of the track upon which the car stands by the clamping mechanism shown in Figs. 4, 5 and 6, while the other branch having the current measuring instrument is similarly connected with the conductor or third rail. As the current interrupter is working automatically this requires no attention of the attendant who is charging the battery. After the battery has been charged the leads are detached from the car and rail, respectively, after which the car with its lighting system is ready for use. By the provision of the lamp regulator 18 it is unnecessary to disconnect the lighting circuit, or even turn off the lights within the car during the charging operation.

It is thus seen that this invention provides a simple and practical system for charging lighting storage batteries of railway cars adapted to accomplish, among others, all the objects and advantages above set forth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In a system for charging a car-lighting storage battery, in combination, a car-track having bonded rails, an insulated local rail paralleling said track, a railway car adapted to be run on said car-track, a storage battery in said car for supplying lamps therein, a detachable flexible lead adapted to connect a terminal of said battery to said local rail, a source of current supply for charging said storage battery, the charging circuit including said lead, said local rail, and said car-track, and means in said charging circuit for periodically varying the current in said circuit.

2. In a system for charging a car-lighting storage battery, in combination, a car-track having bonded rails, an insulated local rail paralleling said track and divided into sections, a railway car adapted to be run on said car-track adjacent a section of said local rail, a storage battery in said car for supplying lamps therein, a detachable flexible lead adapted to connect a terminal of said battery to said local rail, a source of current supply for charging said storage battery, the charging circuit including said lead, said section of said local rail, and the rails of said car-track, and means in said charging circuit for periodically varying the current in said charging circuit.

In testimony whereof I affix my signature, in the presence of two witnesses.

ROBERT M. DIXON.

Witnesses:
H. M. SEAMANS,
P. A. BLAIR.